United States Patent Office 3,558,485
Patented Jan. 26, 1971

3,558,485
FIRE FIGHTING COMPOSITION COMPRISING AN ASBESTOS CONTAINING SLURRY
John E. Skvarla, Lewiston, N.Y., assignor to Union Carbide Corporation, New York, N.Y., a corporation of New York
No Drawing. Continuation-in-part of application Ser. No. 556,586, June 10, 1966. This application July 2, 1969, Ser. No. 838,679
Int. Cl. A62c 3/02
U.S. Cl. 252—7
3 Claims

ABSTRACT OF THE DISCLOSURE

A method of reducing the flammability of forests, shrubbery, grass and the like by coating such materials with an asbestos containing slurry.

---

This application is a continuation-in-part of application Ser. No. 556,586 filed June 10, 1966, and now abandoned.

This invention relates to a fire-fighting composition for use in reducing the flammability of forests, shrubbery, grass and the like. More particularly the present invention relates to the use of a "viscous water" type of fire-fighting composition which can be applied by conventional spraying and foaming techniques and which can also be applied by aerial bombardment methods.

As described in Chemicals for Forest Fire Fighting published by the National Fire Protection Asosciation in 1963, the characteristics desired in a forest fire-fighting composition include:

(a) low cost
(b) ready availability in adequate quantities in areas of primary use
(c) non-toxicity to plant and animal life
(d) good adherency to forest fuels
(e) non-dessicating to vegetation
(f) quantity requirement per gallon of water is small
(g) mixes easily and readily into a stable suspension or solution
(h) not oversensitive to either pH or mineral content of water
(i) not subject to deterioration from bacteria, enzymes, or by action with metals
(j) final characteristics are reached shortly after mixing and do not change with further standing or agitation
(k) flows through fire hoses without serious friction loss, yet sets up and holds once it is applied to forest fuels.

A particular class of fire-fighting composition which has been developed with hopes of conforming to the foregoing criteria is known as the "viscous water" group. A viscous water fire-fighting composition is defined as water which has been thickened by one or more viscosity agents and such compositions are advantageous in that in general these materials stick and cling more readily to forest fuels than plain water, they spread out in a continuous coating over fuel surfaces, and set up on a layer about three times the thickness of plan water, and on account of their greater layer thickness absorb more heat than plain water and thereby reduce the flammability of the fuel. However, previously available viscous water compositions, in spite of their advantages, have not satisfied all of the abovementioned requirements and have been found to have, in several respects, serious disadvantages. For example, previously available "viscous water" prepared through the use of organic materials are subject to bacterial action and, on account of this, loss of viscosity can occur rapidly. Also, the formation of insoluble precipitates in the presence of certain chemicals is a common problem.

It is, therefore, an object of the present invention to provide a stable, non-deteriorating and essentially chemically inert viscous water type of fire-fighting composition which satisfies the desirable criteria set forth hereinabove.

It is another object of the present invention to provide a viscous water type of fire-fighting composition which is compatible with, and to which can be added, flame-inhibiting chemicals and foaming agents.

A fire-fighting composition for use in accordance with the present invention is a water suspension or slurry of finely divided asbestos, the asbestos content being sufficient to make the water suspension viscous. The asbestos used, which is suitably present in amounts varying from about 1 to 10% by weight of the water suspension, is chrysotile asbestos having the following properties:

Specific surface area: 60–80 m.$^2$/gm.
Magnetite content: 0.04–0.5%
Reflectance: 72–78%
Wet bulk: 750–980 ml.

This asbestos, derivable in large quantities by processing ore from the Coalinga California deposit, is commercially available from Union Carbide Corporation under the designation "High Purity Grade Asbestos" and is described in more detail in U.S. patent application 396,935 entitled "Process for Refining Asbestos and Resultant Product," the disclosure of which is incorporated herein by reference.

This patent application describes an effective process for producing asbestos having the aforementioned properties which comprises: (1) contacting asbestos ore containing asbestos, coarse rock, fine gangue and other non-asbestos impurities with water, (2) separating coarse rock and fine gangue from the remainder of the wet ore, (3) comminuting the remaining (i.e. coarse rock and gangue free) wet ore until all of the ore particles are able to pass through a screen having circular holes no larger than about 0.03 inch in diameter, (4) adding sufficient additional water to the comminuted ore to form a slurry having a solids content no greater than about 3%, (5) hydrocycloning the slurry formed in step (4), i.e., providing a hydrocycloning zone having an inlet, an overflow, and an underflow conduit, and passing the slurry through said zone at a flow rate sufficiently high to produce a centrifugal force inside said zone at least equal to 50 G's, and at the same time maintaining the ratio of the overflow rate to the underflow rate greater than about 0.5; whereby substantially pure asbestos fibers emerge in the overflow, and (6) recovering the purified asbestos fibers from said overflow.

In preparing the fire-fighting composition in accordance with this invention, dry fibers of asbestos, or pelletized fibers are slurried with water by means of the conventional beater tank or by use of the pump re-circulation loop of a storage tank. Additionally, in line mixing operations, asbestos can be injected by way of a standard solids feeder into a hose carrying water under turbulent flow conditions and a suitable slurry will be discharged from the hose nozzle and applied to forest fuels and the like. Also, as previously mentioned, the slurry can be applied to forest fuels and the like by means of aerial bombardment techniques and by foaming techniques.

By way of particular example, a 500 gallon batch of the fire-fighting composition of this invention containing 3% by weight asbestos is prepared in a conventional storage tank having a re-circulation loop by:

(1) Introducing about 450 gallons of water into the tank,
(2) Re-circulating the water through the tank under turbulent flow, (3) Adding about 125 pounds of asbestos to the tank while the water is re-circulating, (4) Continuing re-ciruulation under turbulent flow conditions to provide a complete circulation of the water-asbestos mixture. With the usual equipment this can be accomplished in a matter of minutes, (5) Topping off the tank by adding 50 gallons of water, and (6) Continuing re-circulation to provide one more complete re-circulating of the water-asbestos mixture under turbulent flow conditions.

By following the foregoing procedure, a stable water slurry of asbestos characterized by a gelatinous structure is quickly obtained which has a high viscosity and which remains stable indefinitely and can be readily applied to the surfaces of forest fuels by conventional spraying, foaming and aerial bombardment techniques.

Slurries of water and asbestos in accordance with the present invention can be adjusted with respect to viscosity by varying the asbestos content. All water-asbestos slurries of this invention are characterized by a gelatinous structure created by the colloid-like asbestos fibers (which are about 200–300 angstroms diameter and 0.25–10 microns in length) and Table I shows the viscosities obtained with different amounts of asbestos.

TABLE I.—VISCOSITY OF WATER-ASBESTOS SLURRIES OF THIS INVENTION, MEASURED BY BROOKFIELD MODEL LVF HELIPATH VISCOMETER

| | Brookfield spindle designation | R.p.m. | Viscosity, centipoises |
|---|---|---|---|
| Asbestos, percent by weight: | | | |
| 1 | T–A | 6 | ≧1,000 |
| 2 | T–C | 6 | 10,000 |
| 4 | T–D | 6 | 25,000 |
| 8 | T–F | 6 | 132,000 |

A particular advantage of the present invention is that its high viscosity provides exceptionally good adhesion to forest fire fuels. To illustrate this feature, identical wooden blades of known surface area representing forest fuel material were dipped into plain water and various asbestos-water sample slurries of this invention and thereby coated and the weights of retained material were measured and compared by calculating a slurry/water ratio as follows:

$$S/W=\frac{\text{Weight increase of blade dipped in sample}}{\text{Weight increase of blade dipped in water}}$$

The results shown in Table II indicate the weight of an adhering film on the wooden blades and thus the thickness of the film for various compositions of this invention as compared to water. The thickness of the film indicates the effectiveness of the slurry in reducing the flammability of the fuel material.

TABLE II

| Sample (percent asbestos by weight): | S/W |
|---|---|
| 0 (plain water) | 1 |
| 1 | 2.0 |
| 2 | 3.6 |
| 3 | 6.4 |
| 4 | 8.4 |
| 5 | 9.1 |
| 6 | 10.7 |

A further advantage of the asbestos-containing composition used in the practice of this invention is that it is capable of retaining large amounts of water within its characteristic gelatinous structure and this provides increased opportunity for water penetration which is important in fighting the so-called "duff" fires and under other circumstances. This feature is of particular importance since most if not all previously known "viscous water" type compositions do not have this capability.

The data of Table III illustrates this aspect of the present invention and shows the relative amounts of free and retained water for asbestos slurries of this invention when placed on a 100 mesh screen and allowed to drain for 5 minutes.

TABLE III

| | Water retained in slurry | Free water |
|---|---|---|
| Percent by weight asbestos in slurry: | | |
| 1 | 47 | 53 |
| 2 | 68 | 32 |
| 3 | 74 | 26 |
| 4 | 79 | 21 |
| 5 | 85 | 15 |

The composition of the present invention is additionally advantageously characterized by pseudo plastic flow characteristics which yield flow rates shown by the test results of Table IV for a 3% asbestos-water composition of this invention through a 1-inch (inside diameter) hose.

TABLE IV

Flow rates, 3% asbestos slurry through 100 feet of 1 in. I.D. rubber hose

| Flow, gal./min.: | Pressure, p.s.i.g. |
|---|---|
| 10 | 24 |
| 20 | 30 |
| 30 | 34 |
| 35 | 36 |
| 40 | 47 |

To further illustrate the properties of the water-asbestos compositions of this invention Table V shows a comparison of flow rates through a one-inch I.D. hose of various asbestos-water slurries with respect to plain water.

TABLE V

| | Flow velocity, ft./sec. | Percent of plain water flow velocity for same pressure |
|---|---|---|
| Asbestos-water composition: | | |
| 2.5% asbestos | 10 | 28 |
| Do | 15 | 75 |
| 3.4% asbestos | 12 | 22 |
| Do | 16 | 55 |
| 4.2% asbestos | 15 | 20 |
| Do | 20 | 60 |

In addition to the foregoing advantages it has been also found that on account of the aforementioned small fiber size and high purity of the asbestos addition, that the asbestos-water composition in accordance with this invention can be used with all standard fire-fighting equipment without danger of erosion or plugging.

By way of example, Table VI shows the relative abrasiveness of the asbestos addition of this invention as compared to other materials.

TABLE VI

Relative abrasion factors

| | |
|---|---|
| Asbestos addition material | 1 |
| Bleached sulfite pulp | 2 |
| Diatomite | 10 |
| Bentonite clay | 39 |

The foregoing Table VI shows for example that the asbestos is only one-half as abrasive as sulfite pulp and one-tenth as abrasive as diatomite. The method and equipment for making the measurements of Table VI were described and published in the Proceedings of the Conference on "Nuclear Applications to the Wood, Paper and Pulp Industries." The conference was held Apr. 23–24, 1964, and was sponsored by the Institute of Technology of Washington State University and the Division of Isotopes Development of the U.S. Atomic Energy Commission.

In a further embodiment of the present invention, one or more fire-retardant and/or fire-suppressing chemical additives, such as ammonium sulfate, ammonium phosphate and ammonium chloride can be added to the asbestos-water composition to provide long-term fire protection. Also, wetting agents such as commercial detergents, e.g., Tergitol,[1] can be used with the asbestos-water composition, with or without chemical additives to provide increased penetration of the fuel upon release of "free water" from the slurry.

The aforementioned fire-fighting compositions can be easily prepared, for example by dry blending the asbestos with the chemical additive and if desired other materials such as vegetation coloring dyes and corrosion inhibitors. The dry mix can then be converted to an aqueous slurry by the techniques previously described.

The following Tables VII(a) and VII(b) show suitable compositions in accordance with the present invention containing chemical additives.

TABLE VII(a).—AQUEOUS SLURRIES

| Additive | Percent by weight additive |
|---|---|
| Asbestos, weight percent: | |
| 1–10 _____ Ammonium sulfate_____ | 5–35 |
| 1–10 _____ Ammonium phosphate____ | 5–35 |
| 1–10 _____ Ammonium chloride_____ | 5–35 | to produce stable foams of high strength with low drain rates. Only relatively small amounts of foaming agent are required, and conventional foaming techniques can be used.

The following Table VIII shows test results of foams prepared in accordance with the present invention. In obtaining the data of Table VIII, a 100 ml. solution of water or asbestos-water slurry was made with the indicated foaming agent. The solution was agitated for 30 seconds and the volume of foam produced was compared to the original 100 ml. volume and the ratio recorded as the Foam Ratio. The foam was observed and the times noted at which 25% (25 ml.) and 50% (50 ml.) of solution had come out of the foam. It can be seen from Table VIII that the compositions of the present invention produce stable long lasting foams.

A further test was performed by placing a portion of the foams produced on surfaces of kerosene and acetone to determine the effectiveness of the foams with the respective type of fuels represented by these materials. A "Y" in Table VIII indicates that the foam did not break down and shows the foam to be effective against fires supported by the material specified. Of particular significance is the finding that with the use of foaming agents (1) and (2) with an asbestos-water slurry of this invention, a foam is obtained which is "compatible," i.e., stable, in the presence of both the "kerosene," i.e., hydrocarbon and "acetone," i.e., polar type fuels.

TABLE VIII.—COMMERCIAL FOAMING AGENTS AND ASBESTOS MIXTURE

| Foaming agent* | Percent by wt. foam agent | Percent by wt. asbestos | Drain Time, min. | | Foam ratio | Compatibility with— | |
|---|---|---|---|---|---|---|---|
| | | | 25% | 50% | | Kerosene | Acetone |
| (1) Unox_____ | 2 | 0 | _____ | 3 | 6 | Y | _____ |
| | 1 | 1 | _____ | 5 | 5 | _____ | Y |
| (2) Apex_____ | 2 | 0 | _____ | 5 | 4 | Y | _____ |
| | 1 | 1 | _____ | 9 | 3 | Y | _____ |
| | 1 | 2 | 15 | 25 | 2 | Y | Y |
| (3) National 99_____ | 3 | 0 | 2 | 6 | 4 | Y | _____ |
| | 1 | 1 | 27 | _____ | 2 | Y | Y |
| (4) National 3% cold___ | 3 | 0 | 6 | _____ | 5 | _____ | _____ |
| | 1 | 1 | 5 | _____ | 3 | Y | _____ |
| | 1 | 2 | 15 | _____ | 2 | Y | _____ |
| (5) National 3% regular | 3 | 0 | 2 | _____ | 5 | Y | _____ |
| | 1 | 1 | 10 | _____ | 3 | Y | _____ |
| | 1 | 2 | 30 | _____ | 2 | Y | _____ |
| (6) National 6% regular | 3 | 0 | 2 | 4 | 5 | Y | _____ |
| | 1 | 1 | 11 | 25 | 3 | Y | _____ |
| | 1 | 2 | 19 | _____ | 2 | Y | _____ |
| (7) Petrojet_____ | 3 | 0 | 2 | 4 | 5 | Y | _____ |
| | 1 | 1 | 14 | 25 | 2 | Y | _____ |
| | 1 | 2 | 25 | _____ | 2 | Y | _____ |

*Commercially available under these names:
(1) Trademark of Union Carbide Corp. (anionic type).
(2) Protein based.
(3) Product of National Foam Systems Inc.
(4) Product of National Foam Systems Inc.
(5) Product of National Foam Systems Inc.
(6) Product of National Foam Systems Inc.

TABLE VII(b).—DRY MIX

| Additive: | Weight of additive/ weight of asbestos |
|---|---|
| Ammonium sulfate _____ | 1–70 |
| Ammonium phosphate _____ | 1–70 |
| Ammonium chloride _____ | 1–70 |

A still further embodiment of the present invention involves the use of foaming agents with the asbesto-water composition, with or without chemical additives. Nonionic, anionic, cationic, and protein type commercially available foaming agents have been employed and found In addition to the above-mentioned advantages, the asbestos-water composition of this invention has been found to be unaffected by the pH or mineral content of the water. Also, the composition is non-toxic to plant and animal life; its final characteristics are attained shortly after the mixing of asbestos and water, and the asbestos-water composition can be stored indefinitely.

The parameters specific surface area, magnetite content, reflectance and wet bulk, previously mentioned hereinabove, are defined as follows:

Specific surface area is calculated from adsorption data using the BET (Brunauer, Emmet, Teller) method as described in Brunauer, "The Adsorption of Gases and Vapors," Princeton University Press (1945).

---
[1] Trademark of Union Carbide Corporation.

Magnetite content is measured by a permeametric device patterned after ASTM standard method D-1118-57 and modified with respect to sensitivity to measure a limit of detection of 0.005% magnetite, and the range extended to measure 0.10% magnetite in the mid-scale of the instrument.

Reflectance is measured on a sample prepared according to TAPPI (Technical Association of the Pulp and Paper Industry) standard T-452-m-58 and reported as percent of ultimate reflectance based on magnesium oxide as 100% reflectance.

Wet bulk is a measurement of the terminal settled volume which a given weight of an asbestos suspension will have at the end of a specified period of time. It is also a practical indication of the completeness of the fiberization or openness of the asbestos. The specific test is as follows: 2 grams of asbestos are placed in a graduated cylinder containing 1000 ml. of distilled or demineralized water. The cylinder is then gently inverted and returned to an upright position 10 times and then placed on a reasonably vibration free bench. The level of the asbestos suspension (clear water interface) is read at the end of one hour. The volume of suspension is the "wet bulk."

What is claimed is:

1. In a method of treating forest fuels material to reduce the flammability thereof by coating said material with a film of water, the improvement which comprises coating said material with a slurry consisting essentially of a suspension of finely divided asbestos in water wherein the asbestos constitutes between about 1 and 10 percent by weight of the suspension and is characterized by the following:

Specific surface area: 60–80 m.$^2$/g.
Magnetite content: 0.04–0.5%
Reflectance$_{eff}$ 72–78%
Wet bulk: 750–980 ml.

2. A method in accordance with claim 1 wherein said slurry additionally contains a dissolved water-soluble fire-suppressing substance selected from the group consisting of ammonium sulfate, ammonium phosphate and ammonium chloride.

3. A method in accordance with claim 1 wherein said slurry additionally contains a foaming agent dispersed therein.

References Cited
UNITED STATES PATENTS

| | | | |
|---|---|---|---|
| 2,551,919 | 5/1951 | Williamson et al. | 169—14 |
| 2,652,325 | 9/1953 | Novak | 252—313X |
| 2,661,287 | 12/1953 | Barbaras | 252—313X |
| 2,880,172 | 3/1959 | McCutchan | 252—2 |
| 2,901,428 | 8/1959 | Schulenburg | 252—2X |
| 3,196,108 | 7/1965 | Nelson | 252—2X |
| 3,445,384 | 5/1969 | Schreiber | 252—2 |

JOHN T. GOOLKASIAN, Primary Examiner

D. J. FRITSCH, Assistant Examiner

U.S. Cl. X.R.

252—2, 3, 4, 8.1